(12) United States Patent
Johnson (10) Patent No.: US 9,840,264 B1
(45) Date of Patent: Dec. 12, 2017

(54) PORTABLE ELECTRONIC DEVICE HOLDER FOR A SHOPPING CART

(71) Applicant: Chad R. Johnson, Ellensburg, WA (US)

(72) Inventor: Chad R. Johnson, Ellensburg, WA (US)

( * ) Notice: Subject to any disclaimer, the term of this patent is extended or adjusted under 35 U.S.C. 154(b) by 70 days.

(21) Appl. No.: 15/153,279

(22) Filed: May 12, 2016

Related U.S. Application Data (60) Provisional application No. 62/160,077, filed on May 12, 2015.

(51) Int. Cl.
*B62B 5/00* (2006.01)
*B62B 3/14* (2006.01)

(52) U.S. Cl.
CPC .......... *B62B 3/1416* (2013.01); *B62B 3/1424* (2013.01)

(58) Field of Classification Search
CPC ... B62B 3/1424; B62B 3/1428; B62B 3/1408; B62B 3/1416; Y10S 224/929; B60R 11/0071; B60R 11/0241; B60R 11/02
USPC .................................................. 224/409, 411
See application file for complete search history.

(56) References Cited

U.S. PATENT DOCUMENTS

| | | | |
|---|---|---|---|
| 3,881,267 A * | 5/1975 | Hicks .................... | B62B 3/1428 40/308 |
| 5,235,767 A | 8/1993 | Waterman et al. | |
| 5,301,443 A | 4/1994 | Gori | |
| 5,903,645 A * | 5/1999 | Tsay .................... | B60R 11/0241 248/316.4 |
| 7,551,458 B2 * | 6/2009 | Carnevali ........... | B60R 11/0252 174/520 |
| 7,984,886 B2 * | 7/2011 | Lin ...................... | B60R 11/0252 108/44 |
| 8,074,951 B2 * | 12/2011 | Carnevali ............... | B60R 11/02 108/143 |
| 8,136,275 B2 | 3/2012 | Sonnendorfer et al. | |
| 8,256,651 B2 | 9/2012 | Reynolds | |
| 8,490,937 B2 * | 7/2013 | Crain ..................... | G01C 15/00 224/929 |
| 8,690,210 B1 * | 4/2014 | May .......................... | A45F 5/00 224/217 |
| 8,833,716 B2 * | 9/2014 | Funk ...................... | F16M 13/02 248/309.1 |
| 9,097,380 B2 * | 8/2015 | Wheeler ................. | A47F 7/024 |

(Continued)

FOREIGN PATENT DOCUMENTS

| | | |
|---|---|---|
| EP | 0520069 A1 | 12/1992 |
| WO | 1998030427 A1 | 7/1998 |

*Primary Examiner* — Adam Waggenspack
(74) *Attorney, Agent, or Firm* — Robert C. Montgomery; Montgomery Patent & Design, LP.

(57) ABSTRACT

A caddy is adapted to clamp to a cylindrical shopping cart handle. Affixed to an upper portion of the clamp is an enclosure composed of a durable, transparent material configured to comprise two (2) planar panels with an intervening space. Openings at either side of the enclosure permit the insertion of appropriately sized pieces of paper, or paper stock, bearing certain indicia. Attached at an upper surface of the enclosure is a turntable adapted to accommodate a pedestal suitable for the placement of a portable electronic device device, such as a mobile telephone. The pedestal is further provided with additional, adjustable brackets capable of restraining mobile electronic devices of various sizes.

18 Claims, 6 Drawing Sheets

(56) References Cited

U.S. PATENT DOCUMENTS

2004/0069918 A1* 4/2004 McKinney ............ B62B 3/1428
                                                 248/274.1
2010/0289234 A1   11/2010 Sonnendorfer et al.
2012/0161406 A1    7/2012 Mersky
2014/0103086 A1    4/2014 Olivieri
2014/0339278 A1* 11/2014 Ditore ...................... B62B 5/00
                                                  224/411

* cited by examiner

PORTABLE ELECTRONIC DEVICE HOLDER FOR A SHOPPING CART

RELATED APPLICATIONS

The present invention was first described in and claims the benefit of U.S. Provisional Application No. 62/160,077, filed May 12, 2015, the entire disclosures of which are incorporated herein by reference.

FIELD OF THE INVENTION

The present invention relates generally to a holder for a portable electronic device capable of clamping onto a tubular element.

BACKGROUND OF THE INVENTION

Portable electronic devices continue to shrink in size while expanding in power and capabilities. Smart phones and tablet computers not only provide phone service, email and internet access, but also serve as a device for organizing information, compiling shopping lists, comparing shopping prices, viewing nutritional information, displaying coupons, and the like. As such, such devices are referred to by many while grocery shopping, or other store locations where shopping carts are used.

Many find it difficult to hold the portable electronic device while also trying to push the cart. It is especially difficult when the cart is full. Some people may even drop their portable electronic device, thus causing costly damage. If one should constantly put the device back in their pocket or purse, only to pull it out again in a few seconds, they waste valuable time in the process.

Accordingly, there exists a need for a means by which a portable electronic device can be easily accessed while using a shopping cart. The use of the holder allows users of shopping carts the ability to safely and easily utilize portable electronic devices while shopping to help make the shopping experience easier and simpler.

SUMMARY OF THE INVENTION

The present invention advantageously fills the aforementioned deficiencies by providing a holder comprising a cradle having a first face, a second face, a tray, a trough, and a sill. The cradle also comprises a first stabilizer which is located on a first side, a second stabilizer which is located on a second side, and a top stabilizer which is located on a top side. The holder also comprises a first rod adjustment mount which is on the second face, having a first end and a second end, and a second rod adjustment mount on the second face which has a first end and a second end. The holder further comprises a pair of first support rods, each of which is slidably disposed within the first ends of the first rod adjustment mount and second rod adjustment mount, and a pair of second support rods, each of which are slidably disposed within the second ends of the first rod adjustment mount and the second rod adjustment mount. Each first support rod is in mechanical communication with the first stabilizer. Each second support rod is in mechanical communication with the second stabilizer.

The holder also comprises a third and final rod adjustment mount which is on the second face and has a first end and a second end, and a third support rod which is slidably disposed with the third rod adjustment mount. The third support rod is in mechanical communication with the top stabilizer. The holder further comprises a swivel stand which is secured subjacent to the cradle, an enclosure rotationally secured and subjacent to the swivel stand and a clamp which is secured subjacent to the enclosure. The trough is capable of supporting a bottom portion of a portable electronic device while the sill is capable of restricting forward movement of the portable electronic device. The first stabilizer is also adjustable to adaptably secure to a first side of the portable electronic device while the second stabilizer is adjustable to adaptably secure to a second side of the portable electronic device. The top stabilizer is also adjustable and designed to adaptably secure to an upper side of the portable electronic device. The clamp is capable of removable attachment onto a support structure. In an alternate embodiment, the clamp is integrally molded with the enclosure.

The first stabilizer may also comprise at least one (1) first rod housing which is disposed adjacent to each end of a rear face of the first stabilizer. Each first rod housing is configured to receive and retain a first end of each pair of the first support rods while the second end of each the pair of the first support rods is fit with a first rod clamp being within the first ends of the first and second rod adjustment mounts. The second stabilizer may also comprise at least one (1) second rod housing which is disposed adjacent to each end of a rear face of the second stabilizer. Each second rod housing is configured to receive and retain a first end of each of the pair of second support rods while the second end of each the pair of the second support rods is fit with a second rod clamp within the second ends of the first and second rod adjustment mounts. The top stabilizer also comprises a third rod housing which is disposed centrally adjacent to a rear face of the top stabilizer. The third rod housing is configured to receive and retain a first end of the third support rod while a second end of the third support rod is fit with a third rod clamp within the first end of the third rod adjustment mount. The first stabilizer, second stabilizer and top stabilizer may comprise a plurality of pads upon each respective inner face.

The swivel stand may comprise of a circular disc base, a groove disposed about a periphery of the base, a circular disc rotator with a downwardly projecting annular apron and a lip disposed about an interior periphery of the apron. The rotator attaches to the base while the lip slidingly resides within the groove. The enclosure may comprise translucent material and may be capable of receiving a strip which bears indicia.

The clamp may further comprise a first half which has a first flange and a first fastening hinge and a second half which comprises a second flange and a second fastening hinge. The first and second fastening hinges may correspondingly engage each other to attach the first half to the second half. The first flange may be capable of securing to the second flange while the enclosure may be mounted to an upper portion of the first half. The first flange and the second flange may have a plurality of fastener apertures which when the plurality of apertures are aligned an individual fastener may be secured within, thereby securing the clamp to the support structure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 portable electronic device holder
14 first face
18 second face
20 handle clamp
25 clamp first half
30 flange first leg
31 first fastener aperture
35 clamp aperture
40 clamp second half
41 second fastener aperture
45 flange second leg
50 clamp hinge
55 clamp flange
60 clamp retainer
65 enclosure
70 enclosure first face
71 enclosure second face
75 display cavity
80 media strip
85 indicia
90 swivel stand
95 base
100 groove
105 rotator
110 apron
115 lip
120 cradle
125 tray
130 sill
135 reveal
140 trough
145 first rod adjustment mount
146 second rod adjustment mount
147 third rod adjustment mount
150 rod clamp
155 first stabilizer
160 first rod housing
161 second rod housing
162 third rod housing
165 first support rod
166 second support rod
170 second stabilizer
175 stabilizer inner face
180 pad
185 top stabilizer
190 third support rod
200 shopping cart
210 cart handle
220 portable electronic device
230 third fastener aperture
235 fourth fastener aperture

DETAILED DESCRIPTION OF THE PREFERRED EMBODIMENT

The best mode for carrying out the invention is presented in terms of its preferred embodiment, herein depicted within a preferred embodiment FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a shopping cart advertising clamp and portable electronic device holder (herein referred to as the "device") 10, which provides a cradle 120, having adjustable retention stabilizers 155, 170, 185 to hold a portable electronic device 220, such as a mobile telephone or tablet computer, attached to a handle clamp 20 adapted to be adjustably affixed to a cart handle 210 portion of a shopping cart 200. The device 10 includes an enclosure 65 into which a media strip 80, bearing certain indicia 85, can be removably inserted for display. The cradle 120 is mounted to the enclosure 65 via a rotatable swivel stand 90 configured to allow a rotary motion of at least one hundred eighty degrees (180°) along one (1) plane. In the ensuing discussion, the first face 14 of the cradle 120 will be that portion into which the portable electronic device 200 is inserted and retained regardless of the relative position of that cradle 120 to the handle clamp 20. The second face 18 will refer to that side opposite from the projection of a sill 130 from a tray 125. It is envisioned that a merchant would attach the device 10 to the cart handle 210 of shopping carts 200 utilized in their places of business and permit the complimentary use of the devices 10 by customers doing business with the merchant for the purpose of supporting the customer's personal electronic device 220 serving as a tool to assist the shopping. Indicia 85 of a sales promotion nature may be placed on the media strip 80 and inserted into the display cavity 75 of the enclosure 65 to prompt an increase in revenue.

Figure 1:
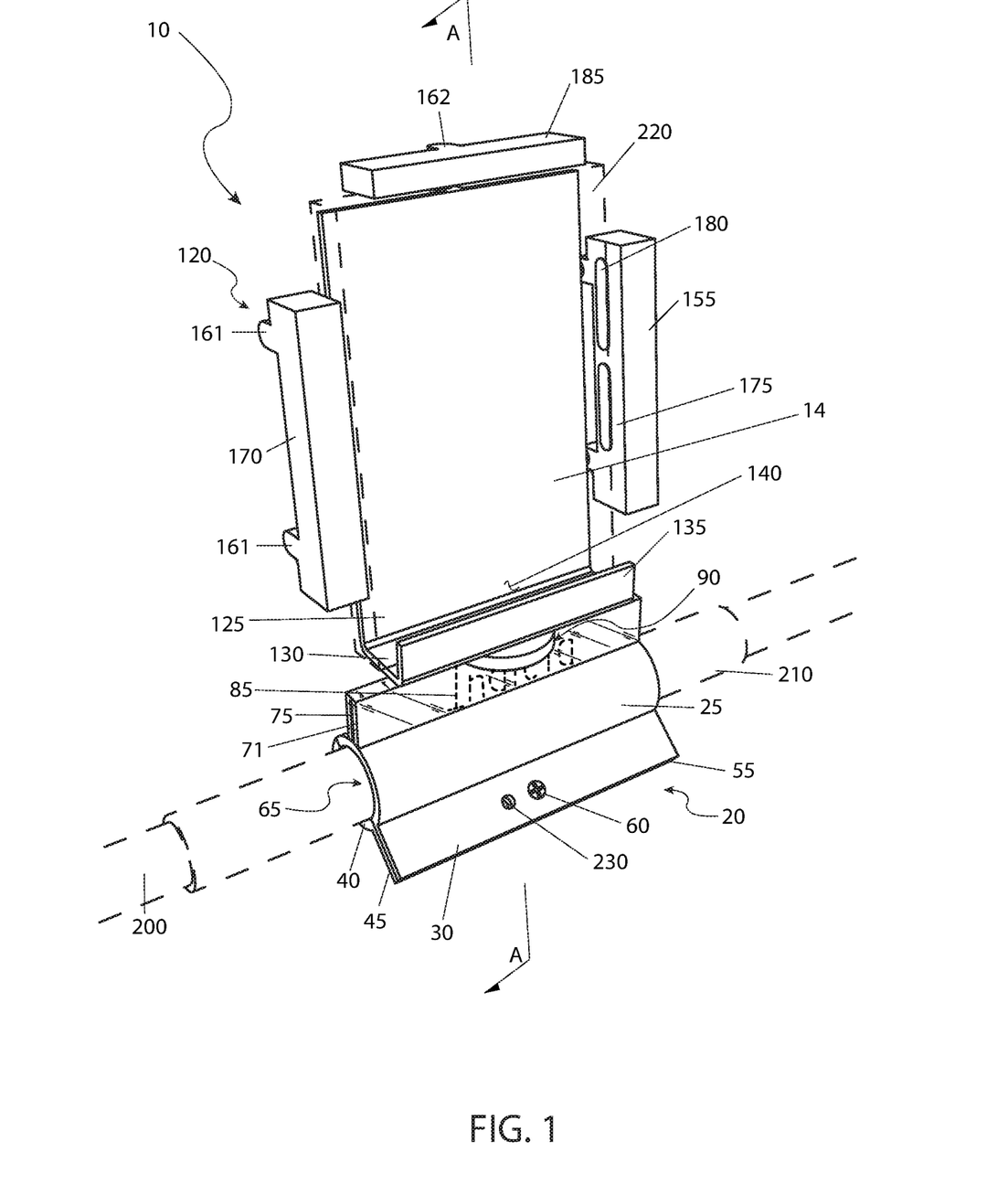
FIG. 1 is an isometric view of a shopping cart handle clamp 20 and portable electronic device holder 10 in accordance with the preferred embodiment of the present invention.
Figure 2:
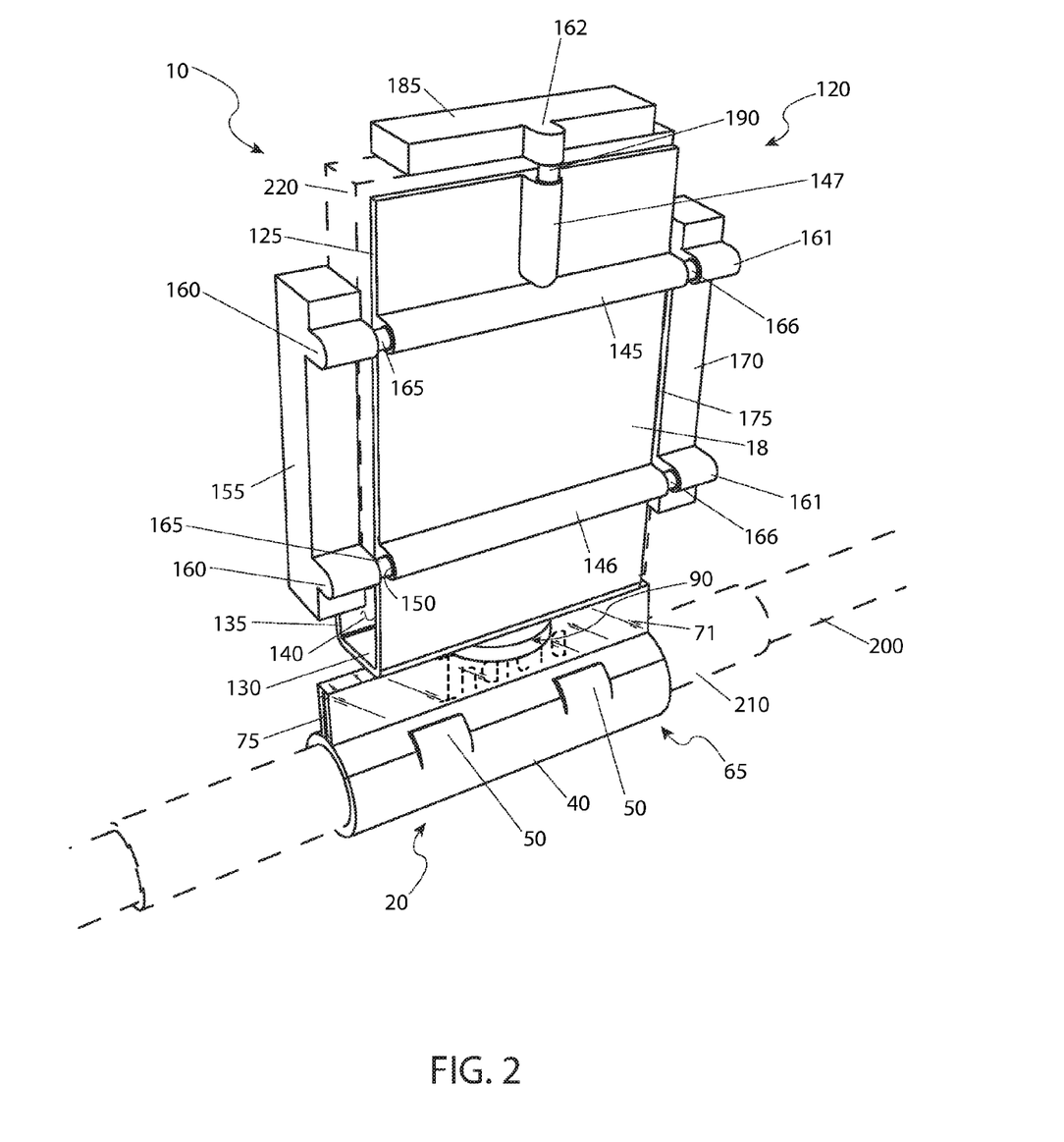
FIG. 2 is an isometric view of a second face 18 of a cradle 120 of the shopping cart handle clamp 20 and portable electronic device holder 10 in accordance with the preferred embodiment of the present invention.

Referring now to FIG. 1, an isometric view of a first face 14, and FIG. 2, an isometric view of a second face 18, of the device 10, according to the preferred embodiment of the present invention, are disclosed. The device 10 includes a handle clamp 20, an enclosure 65 having an enclosure first face 70 and an enclosure second face 71, a swivel stand 90, and a cradle 120 with adjustable retention stabilizers 155, 170, 185. The enclosure 65 is attached to an upper portion of the handle clamp 20 and is oriented in a vertical plane. The enclosure 65 may be formed with a clamp first half 25 or attached thereto in a subsequent procedure involving a mastic or some thermoforming process. The swivel stand 90 is likewise attached to an upper surface of the enclosure 65. Other methods, such as threaded fasteners, or the like, may be utilized to attach the swivel stand 90 to the enclosure 65. The cradle 120 is attached to an upper surface of the swivel stand 90 by the use of any of the previously mentioned methods.

The tray 125 is configured to be planar along a first face 14 for the disposition of the portable electronic device 220. The tray 125 is composed of a rigid thermoplastic material formed in an injection molding process and as such may be presented in a wide variety of colors and surface texture patterns to suit the taste of a user. It is understood that other materials, such as die cast metals, may be utilized without limiting the scope of the device 10. Disposed along a lower edge of the tray 125 and projecting perpendicularly therefrom is a sill 130 formed as an integral part of the tray 125. The sill 130 is of a sufficient depth to accommodate one (1) of a variety of portable electronic devices 220 supported thereon. Attached to the sill 130, and projecting therefrom at an obtuse angle is a reveal 135. The reveal 135 is configured to be of an appropriate height to retain a lower end of a portable electronic device 220 on the sill 130. The space defined by the first face 14 of the tray 125, the upper surface of the sill 130, and a rear face of the reveal 135 is a trough 140. The trough 140 is configured to be a convergent space from top to bottom. It is this trough 140 which actually accepts a lower end of the portable electronic device 220 for retention.

A first rod adjustment mount 145 and a second rod adjustment mount 146 are disposed, preferably in a horizontal and parallel location, on a second face 18 of the tray 125 as illustrated in FIG. 2. These rod adjustment mounts 145, 146 accommodate the insertion of a pair of cylindrical first support rods 165 of a first stabilizer 155 and a pair of cylindrical second support rods 166 of a second stabilizer 170. Similarly, a third rod adjustment mount 147 is disposed vertically adjacent an upper edge of the second face 18 of the tray 125 to accommodate the insertion of a cylindrical third support rod 190. The first and second rod adjustment mounts 145, 146 are each provided with a rod clamp 150 which is a friction device intended to secure the relative positions of the first support rods 165 and the second support rods 166. Similarly, the third rod adjustment mount 147 is provided with a rod clamp 150 which is a friction device intended to secure the relative position of the third support rod 190. It is envisioned that the rod clamps 150, as more clearly depicted in FIG. 6, would be comprised of a thermoplastic material, so as to obviate scoring of the support rods 165, 166, and 190, having an internal diameter appropriately sized to result in a slight interference fit with the diameter of the support rods 165, 166, and 190.

The first stabilizer 155 is a generally rectangular polyhedron with at least two (2) first rod housings 160 disposed along a rear face thereof. The first rod housings 160 are configured to receive and retain a first support rod 165 within a cylindrical cavity (not shown) therein. Similarly, the second stabilizer 170 is a generally rectangular polyhedron with at least two (2) second rod housings 161 disposed along a rear face thereof. The second second rod housings 161 are likewise configured to receive and retain a second support rod 166 within a cylindrical cavity (also not shown) therein. The first and second support rods 165, 166 are each composed of a rigid thermoplastic, or metallic, cylinder. The first stabilizer 155 and the second stabilizer 170 are preferably composed of a rigid thermoplastic and formed in an injection molding process. Disposed along a stabilizer inner face 175 of each stabilizer 155, 170 is at least one (1) pad 180. The pad 180 is composed of rubber, or a rubber-like material, intended to present a resilient, high-friction surface for the retention of the portable electronic device 220. The first stabilizer 155 is intended to be attached to a lateral side of the tray 125 by the insertion of the first support rods 165 into the appropriate first sides of the first rod adjustment mount 145 and second rod adjustment mount 146. The second stabilizer 170 is attached in a similar manner to the opposite lateral side of the tray 125 by the insertion of the second horizontal support rods 166 retained within the second rod housings 161 of the second stabilizer 170 into the second sides of the first rod adjustment mount 145 and second rod adjustment mount 146.

A top stabilizer 185 is configured to be a rigid thermoplastic rectangular polyhedron with preferably one (1) third rod housing 162 disposed along a second face 18 in a manner similar to the first stabilizer 155 and the second stabilizer 170. The third rod housing 162 of the top stabilizer 185 will receive and retain a third support rod 190. The top stabilizer 185 is attached to an upper end of the tray 125 by the insertion of the third support rod 190 retained within the third rod housing 162 into the third rod adjustment mount 145.

Figure 3:
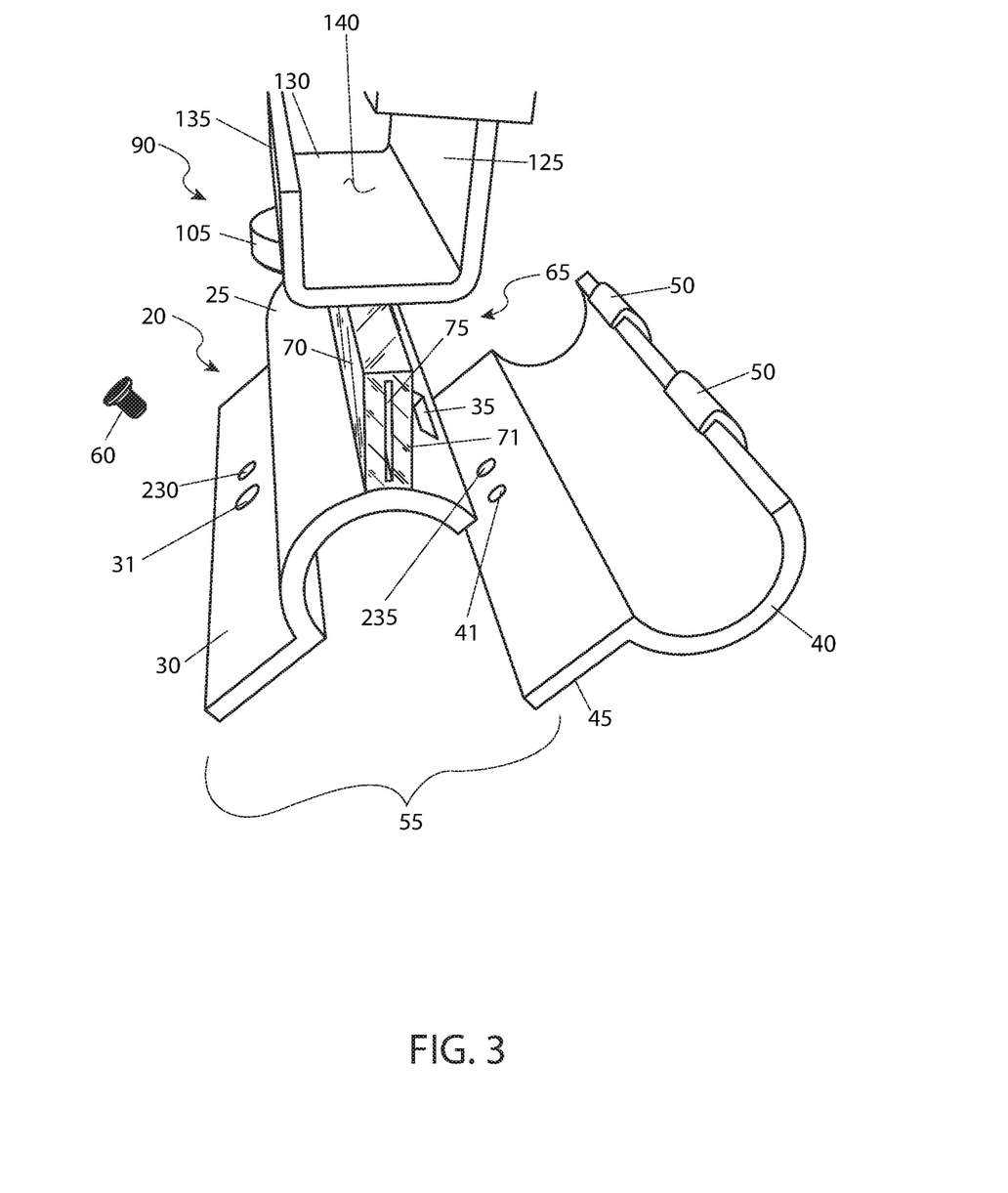
FIG. 3 is an exploded view of a handle clamp 20 of the portable electronic device holder 10 in accordance with the preferred embodiment of the present invention.

Referring now to FIG. 3, an exploded view of the handle clamp 20 of the device 10, according to the preferred embodiment of the present invention, is disclosed. The handle clamp includes the clamp first half 25 and a clamp second half 40 composed of a rigid thermoplastic formed in an injection-molding process and configured to be an open-ended, hollow cylinder capable of being assembled to encircle a cart handle 210 so as to retain the device 10 on a shopping cart 200. The clamp first half 25 is provided with a flange first leg 30. The flange first leg 30 is configured to be a rectangular piece of the same constituent material as the clamp first half 25 projecting radially from the perimeter of the clamp first half 25. A plurality of clamp apertures 35 are disposed in the opposing side of the clamp first half 25. The clamp second half 40 is provided with a flange second leg 45 configured similarly to the flange first leg 30. A plurality of clamp hinges 50, shaped somewhat like a hook, are disposed along a side of the clamp second half 40 opposite from the flange second leg 45. The clamp hinges 50 are inserted into the clamp apertures 35 and the clamp first half 25 and the clamp second half 40 are closed around the cart handle 210. The flange first leg 30 and the flange second leg 45 are placed together at a circumferential location around the cart handle 210 to form a clamp flange 55. A clamp retainer 60, configured to be a threaded fastener, is then inserted into a first fastener aperture 31 aligned with a second fastener aperture 41 and tightened to secure the handle clamp 20 to the cart handle 210. The first fastener aperture 31 is larger than the second fastener aperture 41, thereby allowing the head of the clamp retainer 60 to be countersunk within the first fastener aperture 31. The second fastener aperture 41 is threaded in a complimentary fashion to the clamp fastener 60. While the preferred embodiment is depicted with a clamp flange 50 disposed along the full length of the handle clamp 20, and a single, centrally-located clamp retainer 60, other embodiments can easily be envisioned to have other presentations without limiting the scope of the device 10. Also, a third fastener aperture 130 on the flange first leg 30 adjacent to the first fastener aperture 31, when aligned with a fourth fastener aperture 135 on the flange second leg 45 adjacent to the second fastener aperture 41, can permit the routing of a hasp of a padlock or other similar securing means.

Figure 4:
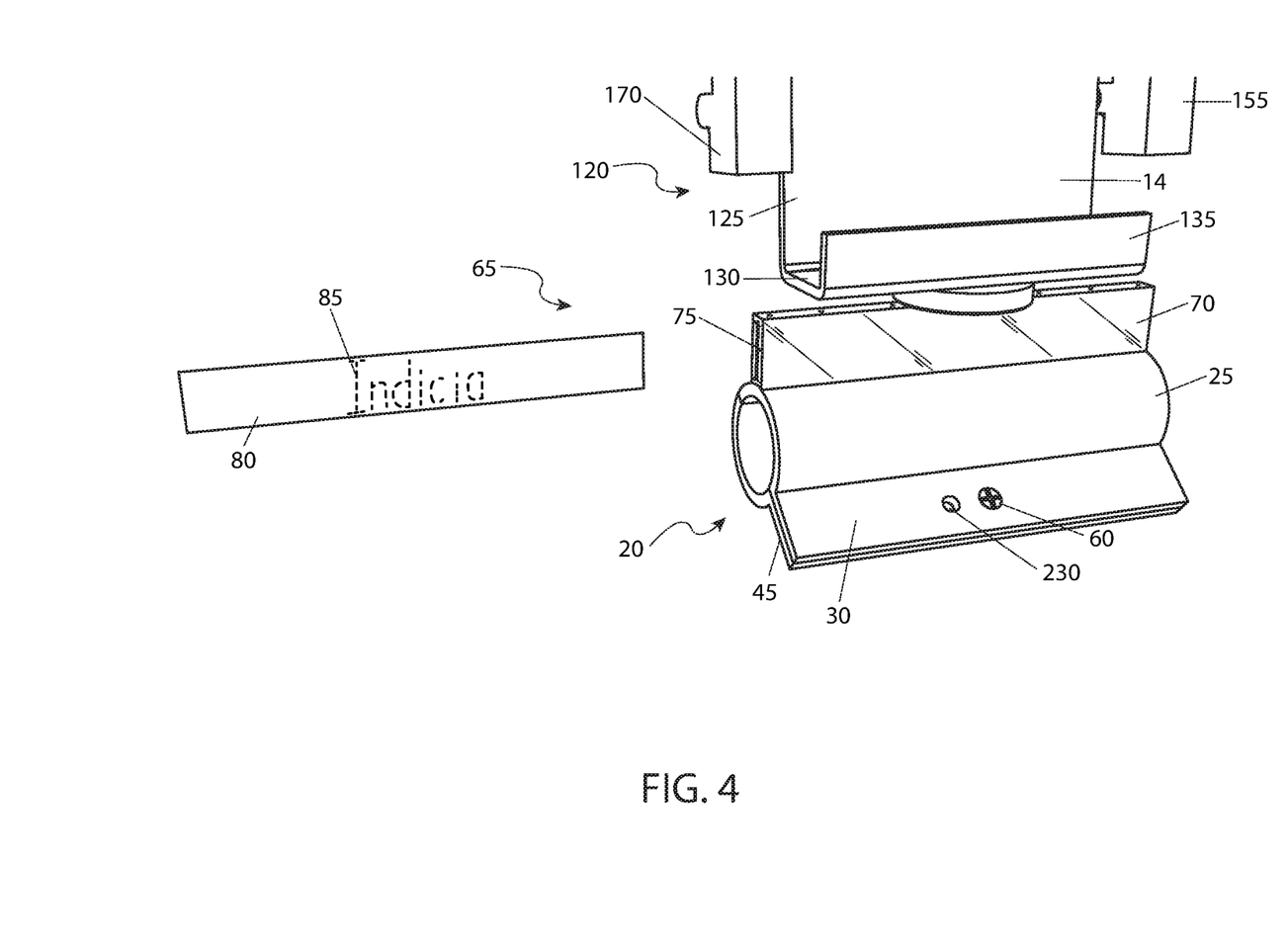
FIG. 4 is an isolated view of an enclosure 65 of the portable electronic device holder 10 in accordance with the preferred embodiment of the present invention.

Referring now to FIG. 4, an isolated view of the enclosure 65 of the device 10, according to the preferred embodiment of the present invention, is disclosed. The enclosure 65 is configured to be a rectangular polyhedron composed of a translucent thermoplastic. A display cavity 75, configured to be an open-ended hollow space, is disposed between an enclosure first face 70 and an enclosure second face 71. A media strip 80, configured to be a paper, or a rigid polymer, can be slidingly inserted into the display cavity 75 so as to be clearly observed from multiple vantage points around the shopping cart 200. The display cavity 75 is accessible via two (2) openings on either enclosure sidewall. Certain indicia 85, carrying images, symbols, or messages, particularly intended to improve sales, may be disposed on the media strip 80. It is understood that the suggested indicia 85 is a limited example of the possibilities which may be presented and should not be seen as a limitation of the scope of the device 10.

Figure 5:
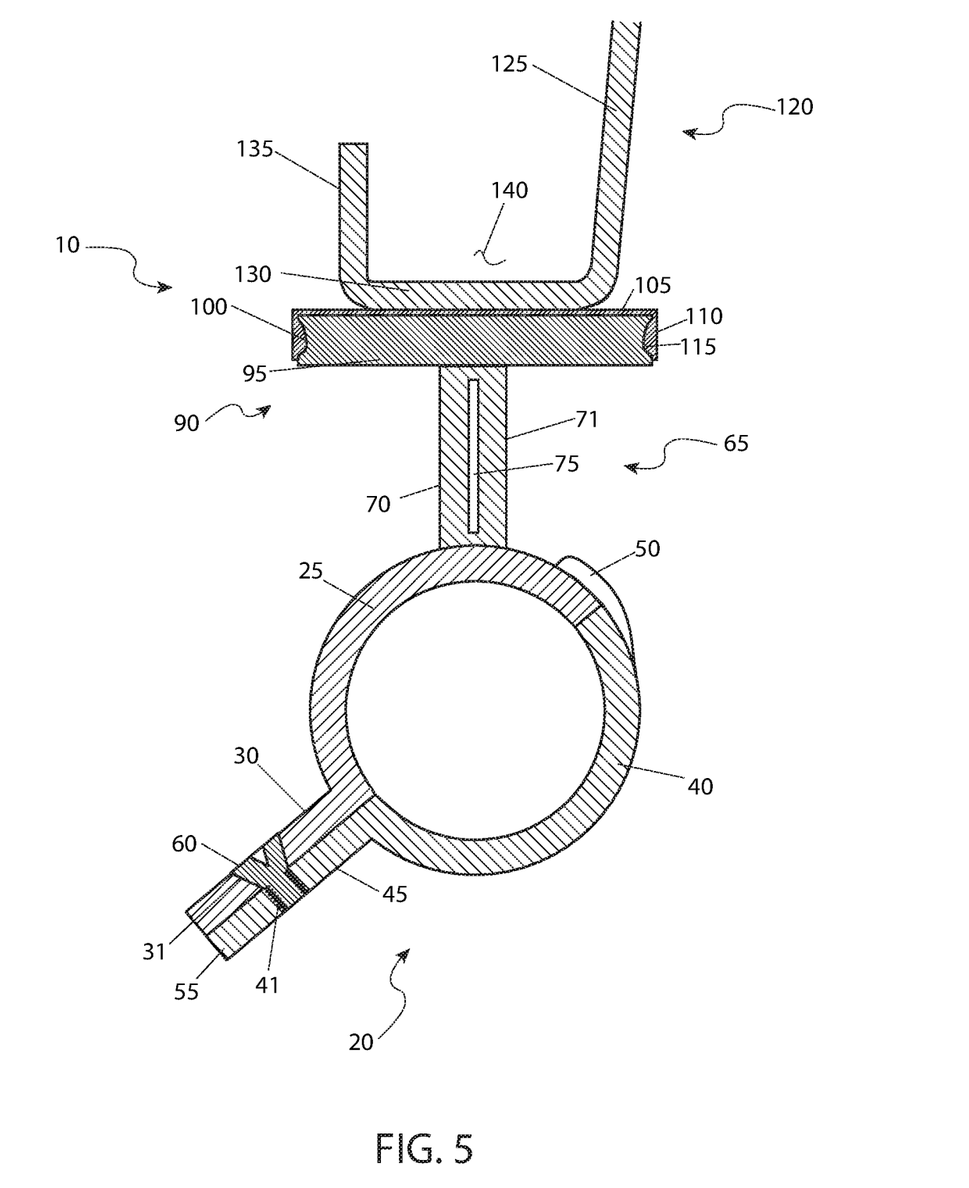
Figure 6:
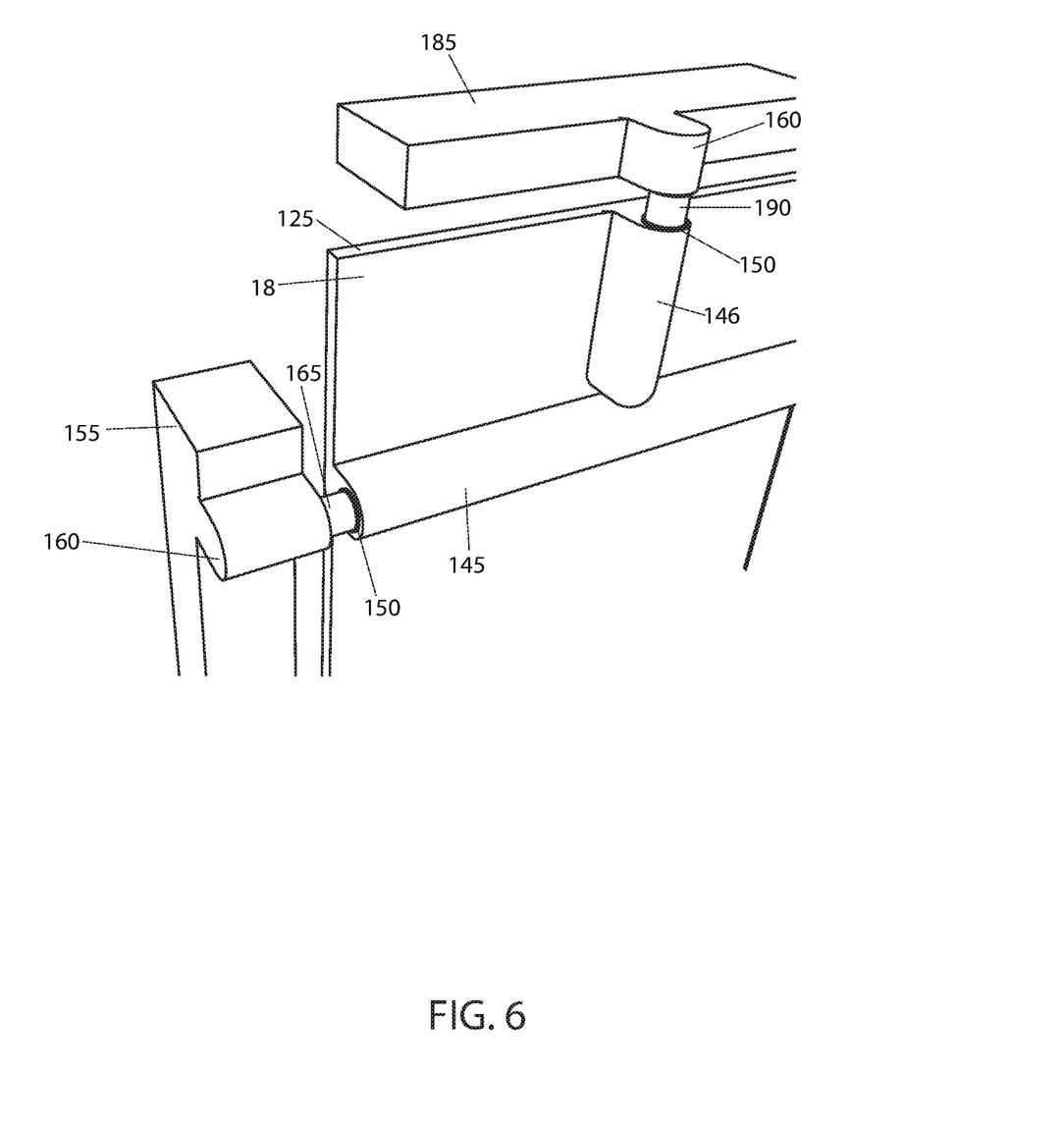
FIG. 6 is a section view along line A-A as seen in FIG. 1 cut through a swivel stand 90 of the portable electronic device holder 10 in accordance with the preferred embodiment of the present invention; and, FIG. 5 is an isolated view of a rod adjustment mount 145 of portable electronic device holder 10 in accordance with the preferred embodiment of the present invention.

Referring now to FIG. 5, a section view along line A-A as seen in FIG. 1 cut through the swivel stand 90 of the device 10, according to the preferred embodiment of the present invention, is disclosed. The swivel stand 90 can be seen to include a base 95 and a rotator 105. The base 95 is a circular disc of a thermoplastic material attached to the upper surface of the enclosure 65 having a planar upper surface perpendicular to the vertical axis of the enclosure 65. A groove 100 is disposed around the periphery of the base 95. The rotator 105 is configured to be a circular disc with a projecting annular apron 10. Disposed along the inside diameter of the apron 100 is a spherical lip 115. The lip 115 is configured to be slidingly retained within the groove 100 so that the rotator 105 can be rotationally displaced relative to the base 95. The cradle 120 is attached, as previously discussed, to the upper face of the rotator 105. The apron 110 of the rotator 105 is placed over the base 95 and pressed so as to force the lip 115 into engagement with the groove 100.

In accordance with the invention, the illustrated embodiment can be utilized by an enabled individual in a simple and straightforward manner with little or no training. After initial purchase or acquisition of the device 10, it would be installed by others as indicated in FIG. 1 and prepared for an end user by the installation of the media strip 80, bearing the preferred indicia 85 into the display cavity 75.

The method of installing and utilizing the device 10 may be achieved by performing a series of steps. It can be appreciated that the operational steps may be performed in alternative order and as such any operational description of use should not be viewed as a limiting factor. Depending on the model and capabilities of the particular portable electronic device 220 utilized, as well as the degree of operational experience accumulated by the user, other tasks, beyond those listed herein, may be achievable. An acceptable level of use may be achieved according to the following steps: acquiring a model of the device 10 having a desired size and style to suit the taste of a user; placing the portable electronic device 220 into the apparatus 10 as previously discussed; adjusting the first stabilizer 155, the second stabilizer 170, and the top stabilizer 185 so as to move the pads 180 located on the stabilizers 155, 170, and 185 into contact with the portable electronic device 220 for a secure in the device 10; energizing the portable electronic device 220 in the normal manner and utilizing the portable electronic device 220 in a beneficial manner to assist the user in the shopping endeavor. The portable electronic device 220 may be accessed by an occupant of the cart seat by rotating the cradle 120 about the swivel stand 90. In use, a portable electronic device 220, such as a smart phone, is inserted into the trough 140 and placed upon the sill 130 with a rear face of the portable electronic device 220 in contact and supported in part by the vertical first face 14 of the tray 125. The first stabilizer 155 and the second stabilizer 170 are adjusted in turn to fit snugly against the vertical side edges of the portable electronic device 220. The top stabilizer 185 is then adjusted to fit snugly against the upper edge of the portable electronic device 220.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A holder, comprising:
    a cradle, having:
        a first face, a second face, a tray, a trough, and a sill;
        a first stabilizer located on a first side thereof;
        a second stabilizer located on a second side thereof; and,
        a top stabilizer located on a top side thereof;
    a first rod adjustment mount on said second face, each having a first end and a second end;
    a second rod adjustment mount on said second face, having a first end and a second end;
    a pair of first support rods, each slidably disposed within said first ends of said first rod adjustment mount and second rod adjustment mount, each in mechanical communication with said first stabilizer;
    a pair of second support rods, each slidably disposed within said second ends of said first rod adjustment mount and said second rod adjustment mount each in mechanical communication with said second stabilizer;
    a third rod adjustment mount on said second face, having a first end and a second end;
    a third support rod, slidably disposed with said third rod adjustment mount, and in mechanical communication with said top stabilizer;
    a swivel stand secured subjacent to said cradle;
    an enclosure rotationally secured subjacent to said swivel stand, said enclosure capable of receiving a strip bearing indicia therein such that the strip is viewable from the exterior of the enclosure; and,
    a clamp secured subjacent to said enclosure;
    wherein said trough is capable of supporting a bottom of a portable electronic device and said sill is capable of restricting forward movement of said portable electronic device;
    wherein said first stabilizer is adjustable to adaptably secure to a first side of said portable electronic device;
    wherein said second stabilizer is adjustable to adaptably secure to a second side of said portable electronic device;
    wherein said top stabilizer is adjustable to adaptably secure to an upper side of said portable electronic device; and,
    wherein said clamp is capable of removable attachment onto a support structure.

2. The holder of claim 1, wherein said first stabilizer comprises at least one first rod housing disposed adjacent each end of a rear face of said first stabilizer;

wherein each said first rod housing is configured to receive and retain a first end of each of said pair of said first support rods; and, wherein a second end of each said pair of first support rods is fit with a first rod clamp within said first ends of said first and second rod adjustment mounts.

3. The holder of claim 2, wherein said second stabilizer comprises at least one second rod housing disposed adjacent each end of a rear face of said second stabilizer;

wherein each said second rod housing is configured to receive and retain a first end of each of said pair of second support rods; and, wherein a second end of each said pair of second support rods is fit with a second rod clamp within said second ends of said first and second rod adjustment mounts.

4. The holder of claim 3, wherein said top stabilizer comprises a third rod housing disposed centrally adjacent a rear face of said top stabilizer;

wherein said third rod housing is configured to receive and retain a first end of said third support rod; and, wherein a second end of said third support rod is fit with a third rod clamp within said first end of said third rod adjustment mount.

5. The holder of claim 4, wherein said first stabilizer, said second stabilizer and said top stabilizer comprise a plurality of pads upon an inner face thereof.

6. The holder of claim 1, wherein said swivel stand comprises:
a circular disc base;
a groove disposed about a periphery of said base;
a circular disc rotator with a downwardly projecting annular apron; and,
a lip disposed about an interior periphery of said apron;
wherein said rotator attaches to said base; and,
wherein said lip slidingly resides within said groove.

7. The holder of claim 1, wherein said enclosure comprises translucent material.

8. The holder of claim 1, wherein said clamp further comprises:
a first half, comprising a first flange and a first fastening hinge;
a second half, comprising a second flange and a second fastening hinge;
wherein said first and second fastening hinges correspondingly engage each other to attach said first half to said second half;
wherein said first flange is capable of securing to said second flange; and,
wherein said enclosure is mounted to an upper portion of said first half.

9. The holder of claim 8, wherein said first flange and said second flange has a plurality of fastener apertures wherein when said plurality of apertures are aligned an individual fastener may be secured within, thereby securing said clamp to said support structure.

10. A holder, comprising:
a cradle having:
a first face, a second face, a tray, a trough, and a sill;
a first stabilizer located on a first side thereof;
a second stabilizer located on a second side thereof; and,
a top stabilizer located on a top side thereof;
a first rod adjustment mount on said second face, each having a first end and a second end;
a second rod adjustment mount on said second face, having a first end and a second end;
a pair of first support rods, each slidably disposed within said first ends of said first rod adjustment mount and second rod adjustment mount, each in mechanical communication with said first stabilizer;
a pair of second support rods, each slidably disposed within said second ends of said first rod adjustment mount and said second rod adjustment mount each in mechanical communication with said second stabilizer;
a third rod adjustment mount on said second face, having a first end and a second end;
a third support rod, slidably disposed with said third rod adjustment mount, and in mechanical communication with said top stabilizer;
a swivel stand secured subjacent to said cradle;
an enclosure rotationally secured subjacent to said swivel stand, said enclosure capable of receiving a strip bearing indicia therein such that the strip is viewable from the exterior of the enclosure; and,
a clamp secured subjacent to said enclosure;
wherein said trough is capable of supporting a bottom of a portable electronic device and said sill is capable of restricting forward movement of said portable electronic device;
wherein said first stabilizer is adjustable to adaptably secure to a first side of said portable electronic device;
wherein said second stabilizer is adjustable to adaptably secure to a second side of said portable electronic device;
wherein said top stabilizer is adjustable to adaptably secure to an upper side of said portable electronic device;
wherein said clamp is integrally molded with said enclosure; and,
wherein said clamp is capable of removable attachment onto a tubular element.

11. The holder of claim 10, wherein said first stabilizer comprises at least one first rod housing disposed adjacent each end of a rear face of said first stabilizer;
wherein each said first rod housing is configured to receive and retain a first end of each of said pair of said first support rods; and,
wherein a second end of each said pair of first support rods is fit with a first rod clamp within said first ends of said first and second rod adjustment mounts.

12. The holder of claim 11, wherein said second stabilizer comprises at least one second rod housing disposed adjacent each end of a rear face of said second stabilizer;
wherein each said second rod housing is configured to receive and retain a first end of each of said pair of second support rods; and,
wherein a second end of each said pair of second support rods is fit with a second rod clamp within said second ends of said first and second rod adjustment mounts.

13. The holder of claim 12, wherein said top stabilizer comprises a third rod housing disposed centrally adjacent a rear face of said top stabilizer;
wherein said third rod housing is configured to receive and retain a first end of said third support rod; and,
wherein a second end of said third support rod is fit with a third rod clamp within said first end of said third rod adjustment mount.

14. The holder of claim 13, wherein said first stabilizer, said second stabilizer and said top stabilizer comprise a plurality of pads upon an inner face thereof.

15. The holder of claim 10, wherein said swivel stand comprises:
a circular disc base;

a groove disposed about a periphery of said base;

a circular disc rotator with a downwardly projecting annular apron; and, a lip disposed about an interior periphery of said apron;

wherein said rotator attaches to said base; and, wherein said lip slidingly resides within said groove.

16. The holder of claim 10, wherein said enclosure comprises translucent material.

17. The holder of claim 10, wherein said clamp further comprises:

a first half, comprising a first flange and a first fastening hinge;

a second half, comprising a second flange and a second fastening hinge;

wherein said first and second fastening hinges correspondingly engage each other to attach said first half to said second half;

wherein said first flange is capable of securing to said second flange; and, wherein said enclosure is mounted to an upper portion of said first half.

18. The holder of claim 17, wherein said first flange and said second flange has a plurality of fastener apertures wherein when said plurality of apertures are aligned an individual fastener may be secured within, thereby securing said clamp to said support structure.

\* \* \* \* \*